Aug. 6, 1940.    C. L. HOPKINS    2,210,668
POWER TRANSMISSION MECHANISM
Filed Oct. 5, 1938    3 Sheets-Sheet 1
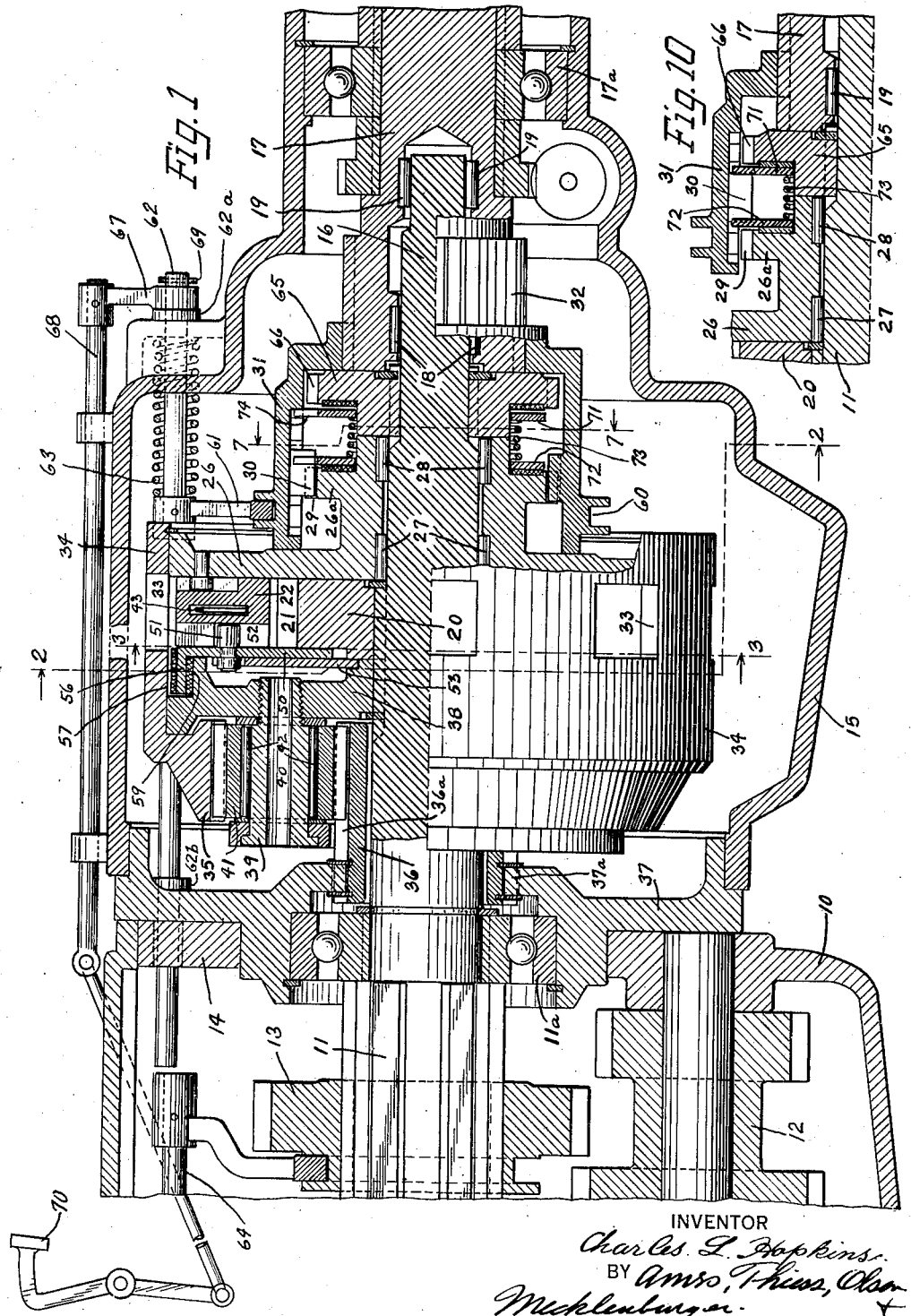
INVENTOR
Charles L. Hopkins.
BY Amso, Thiess, Olson
Mecklenburger.
ATTORNEY Aug. 6, 1940.   C. L. HOPKINS   2,210,668
POWER TRANSMISSION MECHANISM
Filed Oct. 5, 1938   3 Sheets-Sheet 2
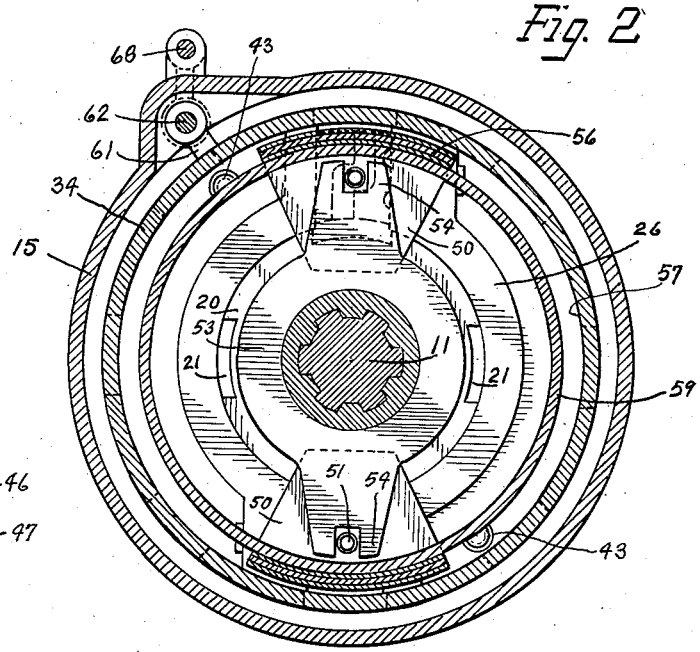
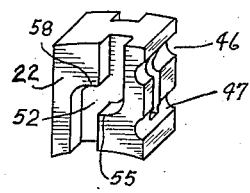
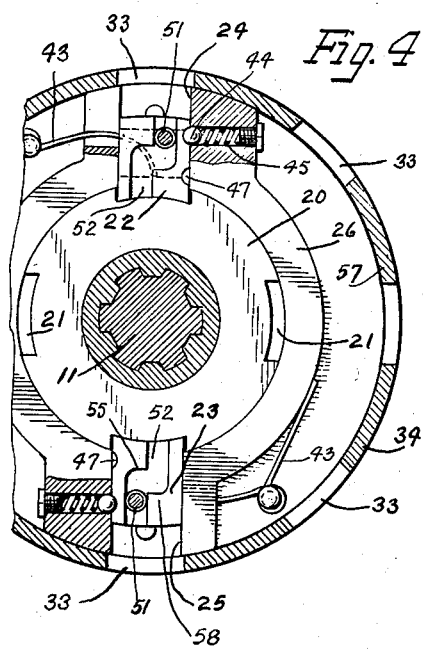
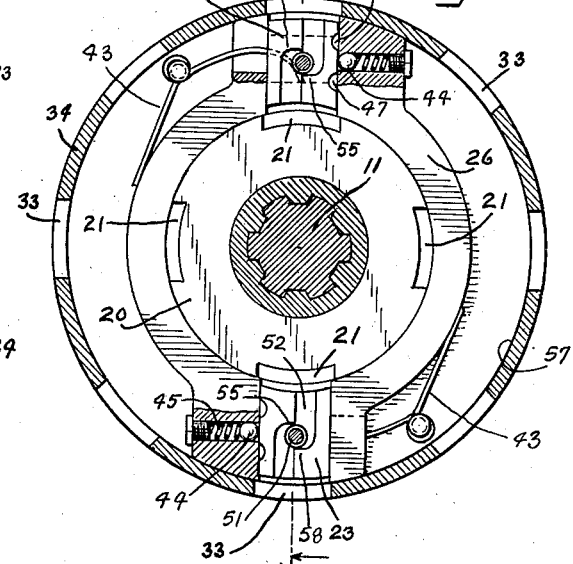
INVENTOR
Charles L. Hopkins
BY
ATTORNEY Aug. 6, 1940.  C. L. HOPKINS  2,210,668
POWER TRANSMISSION MECHANISM
Filed Oct. 5, 1938  3 Sheets-Sheet 3
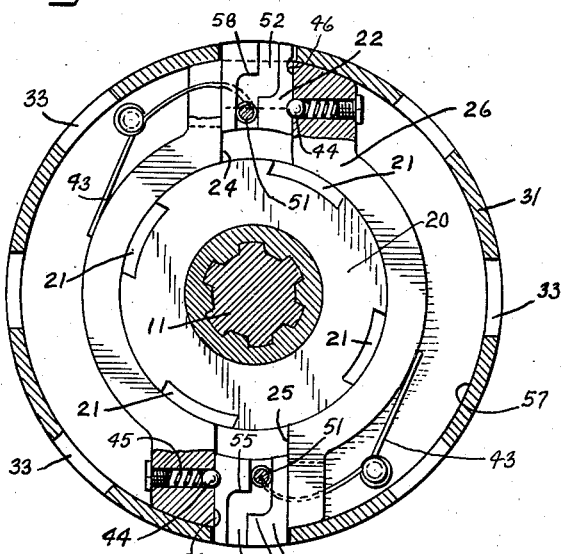
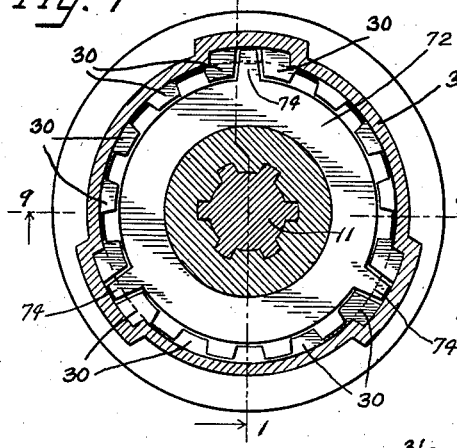
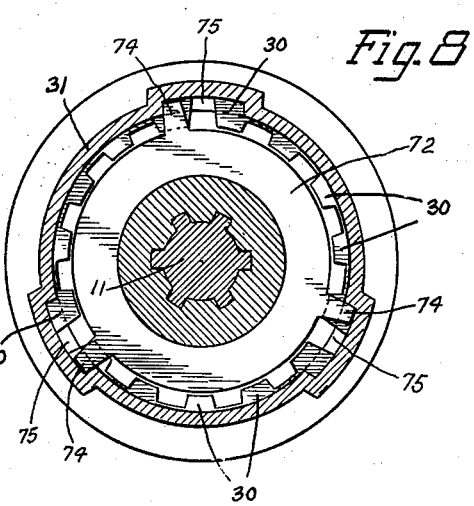
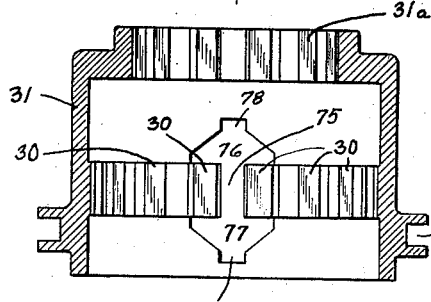
INVENTOR
Charles L. Hopkins
BY
ATTORNEY Patented Aug. 6, 1940

2,210,668

UNITED STATES PATENT OFFICE 2,210,668

POWER TRANSMISSION MECHANISM

Charles L. Hopkins, Oak Park, Ill.

Application October 5, 1938, Serial No. 233,401

18 Claims. (Cl. 192—48)

This invention relates to improvements in power transmission mechanism for motor vehicles in which centrifugal force is employed to operate a clutch device and more particularly to a type of such device in which coupling dogs carried by a revolving part are urged outwardly by centrifugal force toward engagement with a rotating clutch member, this movement being opposed by spring means which urge the dogs inwardly toward engagement with another rotating clutch member. A clutch of this type is especially well adapted for use in the power transmission line of an automobile, and in this specification and the accompanying drawings I have shown and described an embodiment of my invention employed in an automatic overdrive transmission installed behind a standard transmission.

The invention relates also to means whereby, in an automatic overdrive transmission or other automatic power transmission device adapted for use in motor vehicles, in which speed responsive means are employed to couple a driven member to one or the other of two driving clutch members, the speed ratio between the engine and the drive wheels of the car can be changed at the will of the driver at a time when normally the drive would be through the high speed driving clutch member.

One of the objects of the invention is to provide, in transmission mechanism employing two clutch members rotating at different speeds and centrifugal dogs for coupling another member to one or the other of these clutch members, means whereby after the dogs have disengaged themselves from one of the clutch members they are held in neutral position and prevented from engaging the other clutch member until such time as the clutch member toward which the dogs are urged is synchronized with the dog carrying member, whereby clashing is avoided.

Another object is to provide in mechanism of this type employing a plurality of dogs, means whereby it is impossible for one dog to be engaged with the faster-rotating clutch member while another dog is engaged with the slower-rotating clutch member. Where there are two dogs it might happen, because of differences in the strength of the springs, or for other reasons, that one dog would move out of engagement with a clutch member before the other did so, and if the dogs operated wholly independently of each other it might move on into engagement with the other clutch member while the second dog was still interengaged with the first clutch member, which would of course cause damage to some part of the mechanism.

Another object of the invention is to provide a synchronizing clutch of the centrifugal dog type in which the shift from low-speed drive to high-speed drive is made at a higher R. P. M. speed on the dogs than that at which the shift is made from high-speed drive to low-speed drive.

Another object is to provide, in a clutch employing centrifugal dogs, means whereby the shift from one speed ratio to another may be made while the driving clutch members remain coupled to an engine or similar power element, so that unclutching or manual shifting into neutral at some other point in the transmission line will not be required to permit the automatic clutch to shift without clashing.

A further object is to provide for automatic shifting back and forth between different speed ratios without the use of an overrunning clutch anywhere in the transmission line, so that the driver may always use the engine as a brake, as when descending hills, regardless of which speed ratio is in use.

Further objects and advantages of the invention will be apparent from the description and claims.

In the overdrive device shown and described herein, I provide, in addition to an inner, slower moving, driving clutch element and an outer, faster moving, driving clutch element, a third member carrying a pair of dogs which are supported to move radially outwardly under the influence of centrifugal force, this movement being opposed by springs which tend to move them inwardly into engagement with the inner clutch member. I also provide means whereby, after the dogs have moved out of engagement with the inner clutch member, they are prevented from moving beyond the neutral position into engagement with the outer clutch member as long as the latter continues to move faster than the dogs, but are released and permitted to move the rest of the way into engagement with the outer clutch member at the instant when this outer clutch member begins to turn slower than the dogs. Similarly, when the speed of the vehicle is falling and the dogs have disengaged themselves from the outer clutch member, they are arrested in neutral position and held there while the inner clutch member continues to revolve slower than the dogs, and are released and permitted to move the rest of the way into engagement with the inner clutch member as soon as this member begins to move faster than the dogs. This is accomplished by providing for each dog a blocking device which at first permits the dog to move only to neutral position, this blocking device including a drag shoe engaging frictionally the clutch member toward which the dog is urged, or a member or part which turns with it. When the relative rotary movement between this clutch member and the dogs reverses in direction, the blocking devices are carried around through a small angle in a direction which causes them to release the dogs and to permit them to move into engagement with the clutch member toward which centrifugal force, or the springs, cause them to tend to move. The blocking devices are so interconnected that neither of them is permitted to release its dog unless the other dog is in neutral position, that is, out of coupling relation with both clutch members.

In the drawings:

Figure 1 is a view, partly in elevation and partly in vertical longitudinal section on lines 1—1 of Figs. 3 and 7, showing a portion of a standard variable-speed transmission of the sliding gear type with an overdrive device fitted to it, one of the centrifugal dogs being seen in the neutral position; that is, the position in which it is arrested by the blocking device after it has become disengaged from one of the driving clutch members and before the other driving clutch member has been synchronized with it;

Fig. 2 is a vertical cross section taken on lines 2—2 of Fig. 1, looking in the direction of the arrows;

Fig. 3 is a vertical cross-section on line 3—3 of Fig. 1, looking in the direction of the arrows;

Fig. 4 is a section similar to Fig. 3 but showing the dogs engaged with the inner or direct-drive driving clutch member;

Fig. 5 is a perspective view of one of the dogs;

Fig. 6 is a section similar to Figs. 3 and 4 but showing the dogs engaged with the outer or overspeed driving clutch member;

Fig. 7 is a vertical cross-section on line 7—7 of Fig. 1, certain parts being omitted;

Fig. 8 is a view similar to Fig. 7, but showing the drag ring turned to blocking position;

Fig. 9 is a longitudinal section of the sliding coupling sleeve of the rear clutch, taken on line 9—9 of Fig. 7; and Fig. 10 is a fragmentary sectional view of the rear clutch, the sliding coupling sleeve being shown in the neutral position.

In the several figures of the drawings, 10 is the casing of the sliding gear transmission, 11 is the main shaft of the transmission, 12 is the countershaft gear cluster, and 13 is the low speed and reverse sliding gear. The main shaft 11 extends rearwardly beyond the rear end wall 14 of the transmission casing into the housing 15 of the overdrive transmission device and is supported in ball bearings 11a. The rear end 16 of the main shaft 11 is piloted in the tail shaft 17 of the overdrive device, suitable antifriction rollers 18 and 19 being provided between the main shaft and the tail shaft. The tail shaft is carried in ball bearings 17a supported in the housing 15.

Splined on the main shaft 11 so as to turn with it is the inner, slow-speed or direct-drive clutch member 20 consisting of a disk-like member having four notches 21 formed in its periphery. A pair of dogs 22 and 23 are arranged to slide radially in slots 24 and 25 in the dog carrier 26. The dogs ordinarily are engaged in the notches 21 in the inner clutch member 20 when the vehicle is moving at low speeds, this being the direct-drive condition of the clutch. The dog carrier is arranged to rotate freely about the main shaft 11 on antifriction rollers 27 and 28 and is normally connected to the tail shaft 17 by a clutch device comprising a series of teeth 29 on the dog carrier and a series of teeth 30 carried by a sliding coupling sleeve 31 which interlocks with and may be slid forward and backward on splines or teeth 32 formed on the tail shaft 17. Under certain conditions, to be described hereinafter, this coupling sleeve 31 is slid back so as to release or disengage its teeth 30 from teeth 29, thus leaving the dog carrier free to turn independently of the tail shaft.

When the dogs 22 and 23 move to their outermost positions they engage in openings 33 in a drum 34 which constitutes the outer or high-speed driving clutch member. This drum 34 is secured to, or formed as a part of the ring gear 35 of a planetary transmission. The sun gear 36 of the planetary transmission surrounds the shaft 11 and is held against turning by having its gear teeth 36a elongated and intermeshed with internal teeth 37a on a plate 37 which forms part of the end wall of the sliding gear transmission. The planetary pinion carrier 38 is splined to the shaft 11 so as to turn with the latter and carries a series of pins or studs 39, each stud having a passage 40 for the circulation of lubricant. Each stud 39 carries a pinion 41 which meshes with the sun gear 36 and ring gear 35. Suitable antifriction rollers 42 are arranged between the studs and the pinions 41.

Each of the dogs 22 and 23 is provided with a spring 43 which urges the dog inwardly against the influence of centrifugal force which tends to throw the dogs outwardly toward the drum 34. Each dog is also provided with a spring detent to restrain it from shifting out of engagement with either driving clutch member until such time as the speed of the vehicle has risen to or fallen to the predetermined speed at which a shift up or down is to occur. This detent comprises a ball 44 backed by a spring 45 contained in a recess in the dog carrier 26, the ball engaging in one or the other of two notches 46 and 47 formed in the side of the dog. One function of the detent is to provide an overlap of the shift-up speed and the shift-down speed, and it also makes it certain that when the dog disengages itself from one clutch member, it will have sufficient tendency to move toward the other clutch member so that it will not fail to engage with it when released upon synchronization of the clutch member with the dog and the dog carrier.

The means whereby each dog is arrested and prevented from moving beyond the neutral position, after it has disengaged itself from a clutch member, until the other clutch member and the dog are synchronized will now be described. The arrangement is such that not only are the dogs prevented from moving from their neutral positions until the speed of the clutch member is made equal to that of the dogs, but neither dog can move from neutral position until the other dog is in neutral position.

Associated with each dog is a blocking device comprising a drag shoe 50 carrying a stop pin 51 which works in a groove 52 in the front face of the dog. This groove extends from the outer end of the dog down the face of the latter on the right side of its median line (when seen as in Figs. 2, 3, 4, and 6), crosses to the other side of this line, then extends to the inner end of the dog. The blocking devices are interconnected so as to compel them to move together, by means of a ring 53, formed with two oppositely-extending arms 54. Each of these arms is notched to receive the stop pin of one of the blocking devices.

When a dog is engaged in one of the notches 21 in the inner clutch member 20, its stop pin 51 occupies the outer or upper portion of its groove (see Fig. 4, in which the parts are shown in the slow-speed or direct-drive position). When the speed of the vehicle becomes high enough to call for a shift of the dogs from direct drive to overdrive position, say thirty-five miles per hour, the dogs, due to the effect of centrifugal force, force back the detent balls 44 and move outwardly to the neutral position, as seen in Fig. 3. In this position, each dog is free to continue its movement toward the drum 34, so far as the detent balls are concerned, but it is stopped and held here for the present by the engagement of the pin with the shoulder 55 where the groove 52 turns and extends crosswise of the dog. The pressure of the dog against the inner side of the pin forces the outer curved portion 56 of the drag shoe 50 into contact with the inner surface 57 of the drum 34. The drum and the dogs are moving clockwise (when viewed as seen in Figs. 2, 3, 4, and 6) but the drum is moving faster than the dogs and thus the drag shoe is urged by its frictional engagement with the drum in forward or clockwise direction with respect to the dogs. Each pin is thus held in that part of the groove where the shoulder 55 engages the inner side of the pin. As long, therefore, as the drum continues to turn faster than the dog carrier 26, the dogs are blocked and restrained from moving further outward. The driver has retarded the engine in order to permit the dogs to disengage themselves from the inner clutch member, and this causes the slowing down of drum 34. When the speed of the drum falls below that of the dogs, the drum starts to turn backward relatively to the dogs. The drum is actually turning forward, of course, but relatively to the dog carrier and the dogs it turns backward, or counterclockwise. If both dogs are out of engagement with the inner clutch member, this relative backward rotation of the drum now carries the friction shoes backward or counterclockwise, relatively to the dogs, and the stop pins move along the laterally-extending parts of the grooves, as shown in Fig. 3, where the pins are seen to be passing out of contact with shoulders 55 and under the other shoulders 58. The angular movement required to carry the pin from one limit of its possible movement to the other is small, the result being that the shifting of the pin from one position to the other takes place quickly, the drum barely beginning to move relatively backward before the dogs are released and permitted to move outward toward the drum. Each dog then slips into the first opening in the drum which comes into register with it, the detent balls 44 dropping into the notches 41 of the dogs. Figure 6 shows the dogs thus engaged in the openings in the drum, this being the overdrive condition of the device.

It will be seen that the two blocking devices are interconnected in such a way that they must always move together and in the same direction, neither being allowed to turn and release its dog unless the other is free to turn also. If one dog overcomes the restraint imposed upon it by its spring-pressed ball detent and disengages itself from the clutch member before the other does so, it cannot be released and permitted to move into engagement with the other clutch member until the other dog has moved to neutral position.

In shifting down from overdrive to direct drive, that is, from the condition shown in Fig. 6 to that shown in Fig. 4, the dogs are held by the spring-pressed detent balls 44 until the speed of the car has fallen to a point where centrifugal force is no longer great enough to overcome the tendency of springs 43, plus the restraining effect of the ball detents, and prevent the dogs from disconnecting themselves from the drum 34. When a dog has finally disengaged itself from the drum, it moves inwardly until the shoulder 58 engages the stop pin 51, at which point the dog is arrested and is unable to move further toward the inner clutch member until such time as the pin moves to the right. The drag shoe is pressed into frictional engagement with the curved surface of a part which turns in the same direction as the inner clutch member and at the same angular speed. This part, as shown, consists of a flange 59 on the planet carrier 38 of the planetary gear train. If the other dog is still in its outermost position, both drag shoes are prevented from turning in the direction which would cause their pins to pass from under the shoulders 58; thus it follows that both dogs must be in neutral position before either dog can be released, just as is the case when shifting up, as previously explained. While the dogs are still interengaged with the drum 34, the inner clutch member revolves more slowly than the dog carrier, and, therefore, in effect, backward with respect to the dogs. When both dogs have escaped from their ball detents and moved to neutral position with their drag shoes pressed into frictional engagement with the flange 59, the relative direction of rotation between the dog carrier and the inner clutch member is such that the blocking devices are urged counterclockwise relatively to the dogs and the pins 51 prevent the dogs from moving inwardly as long as this condition exists. When the driver retards the engine to permit the dogs to uncouple from the drum, this, of course, causes a still greater relative backward rotation of the inner clutch member. The driver now speeds up the engine, and when the inner clutch member reaches the same speed as the dog carrier the drag shoes are carried forward, that is, clockwise in the figures of the drawings, and the stop pins move over out from under the shoulders 58 on the dogs and permit the dogs to move in and engage in the first notches in the inner clutch member which comes into register with them.

It should be observed that one purpose of the spring-pressed detents is to hold back the dogs and prevent them from shifting out of engagement with a clutch member until the tendency to shift is great enough to assure a complete shift, instead of movement on the part of the dogs merely great enough to carry them to neutral position, even though the speed of the vehicle might have fallen somewhat, due to delay on the part of the driver in speeding up or slowing down the engine after the dogs have gone to neutral position. Furthermore, it is desirable, in order to prevent constant shifting of the dogs back and forth, that the shift-up speed be considerably higher than the shift-down speed. If, for instance, the device is so designed that the shift-up can occur when a road speed of thirty-five miles per hour or over has been attained by the vehicle, the device should be able to shift down at twenty-five miles per hour or any speed below this.

From the foregoing it will be seen that in driving a car fitted with an overdrive transmission of this type, when the driver decides to permit a shift to overdrive and thinks the speed is great enough to effect the shift he retards the engine somewhat. The removal of the load from the dogs permits them to shift to neutral and the vehicle coasts until the speed of the engine and outer clutch member has fallen to the point where the latter synchronizes with the dogs. This will be for only a very brief interval, and if both dogs disengage themselves from the inner clutch member, the shift takes place immediately. However, if it happens that one or both of the dogs remain in engagement with the inner clutch member, due to the speed being too low when the shift is attempted, no harm is done, but the drive will still be through the low speed (direct drive) ratio, and it is only necessary that the driver speed up the engine and car to a little higher speed and again retard the engine. Thus it will be seen that in shifting up the driver merely retards the engine to permit the shift to be made, then proceeds with the car in overdrive.

If the car is in overdrive and the driver desires it to shift back to direct drive and thinks the speed is low enough to effect this, he momentarily retards the engine so as to take the load off the dogs and permit them to go to neutral, then speeds up the engine until the dogs drop into the notches of the inner clutch member and then proceeds with the car in direct drive. If it happens that one or both of the dogs remain in engagement with the outer clutch member, because the shift was attempted while the speed was too high, the drive will still be through the overdrive gear train, until the speed of the car has fallen to the point where the dogs can free themselves from the outer clutch member, whereupon the driver will speed up the engine until the dogs drop into the notches of the inner clutch member.

Any device which is to be introduced into the power transmission line of a motor vehicle must be so designed as to permit the vehicle to be operated in reverse. In an automobile having an overdrive device employing centrifugal dogs provided with blocking synchronizing means, such as shown and described herein, the car might, under certain conditions, be brought to a stop while both of the dogs were held in neutral position. This would not prevent the car from being started forward because the main shaft 11 and the parts which rotate with it would turn in the forward direction (clockwise in Figs. 2, 3, 4, and 6) and carry the drag shoes 50 forward, the stop pins 51 being thus moved out from under the shoulders 58, permitting the dogs to drop into place in the notches of the inner clutch member. In reverse, however, the drag shoes would be turned in the other direction (anticlockwise in the figures) and the stop pins would be held under the shoulders 58 on the dogs.

The driver of a vehicle fitted with an overdrive transmission sometimes desires to shift back to direct drive while the speed of the car is such that the device would normally remain in overdrive. To provide for this and also to make it possible to operate the car in reverse, regardless of whether the dogs are engaged with one of the clutch members or not, I employ another clutch in series with the automatic centrifugal clutch. By shifting the movable element of this clutch, the tail shaft 17 may be disconnected from the dog carrier 26 and connected directly to the main shaft 11. This clutch comprises the internally toothed sleeve 31 slidably splined to the tail shaft at 32 so as to rotate with it and be slidable forward and backward. When sleeve 31 is slid forward its teeth 30 intermesh with corresponding teeth 29 on a clutch member 26a forming part of the dog carrier 26, thus coupling the tail shaft 17 to the dog carrier. This is the normal position of sleeve 31 and when in this position the power to drive the vehicle is transmitted through the dogs and the dog carrier. Sleeve 31 is formed with a groove 60 in which runs a shifter yoke 61 which is fast on a slide rod 62 supported to move endwise in bearings 62a, 62b in the housing 15 of the overdrive device. A spring 63 coiled about shaft 62 urges the shaft, the shifter yoke and sleeve 31 forward. Slide rod 62 extends forward into the space within the transmission casing 10, where it will be engaged by the shifter slide 64 when the low-and-reverse gear 13 is shifted to the reverse-gear position. When this occurs slide rod 62 is forced back and the teeth 30 on the sliding sleeve 31 are unmeshed from the teeth 29 of the dog carrier.

Splined on shaft 11 so as to turn with it is another clutch member 65 formed with a series of teeth 66. When the sleeve 31 has been slid back so that its teeth 30 are out of mesh with the teeth on the dog carrier and in mesh with those on clutch member 65, the drive is from main shaft 11 through clutch member 65 and sliding clutch sleeve 31 to the tail shaft 17. When the transmission gear 13 is again shifted to neutral position, spring 63 forces slide rod 62 and coupling sleeve 31 forward to normal position and the drive is thereafter through the automatic clutch as before.

Slide rod 62 extends rearwardly a short distance outside the housing of the overdrive device where it passes through, and may slide in, an arm 67 which is fast on another slide bar 68. The rear end of rod 62 has a pin 69 extending through it to prevent member 67 from passing off the end of the rod. By sliding rod 68 back (to the right in Fig. 1), the clutch sleeve 31 can be manually shifted to open the clutch and thus disconnect tail shaft 17 from the dog carrier and connect it to clutch member 65 so as to secure a direct drive from the main shaft to the tail shaft regardless of the position of the centrifugal dogs. This rod 68 is extended forward to a button 70 located where it is accessible to the driver's foot. When the driver desires to secure a direct drive condition in spite of the fact that the car is moving at high speed and would normally remain in overdrive, he momentarily retards the engine to remove the load from the teeth of the rear clutch and presses down this button, thus breaking the connection between the automatic clutch and the tail shaft and establishing a direct connection between the main shaft and the tail shaft.

In order to avoid clashing between the teeth of the sliding clutch sleeve and the teeth on clutch member 65 when the sleeve is slid back, and between the teeth of the sliding clutch sleeve and those on the dog carrier when the sleeve is permitted to return to normal, I provide blocking means which prevent interengagement of the teeth unless or until these parts are brought into synchronism. This blocking means comprises a pair of discs 71 and 72. Disc 71 is urged toward clutch member 65 and disc 72 toward clutch member 26a by a spring 73. Each disc is formed with three radially-extending lugs 74. At three points around the sleeve 31 the space 75 between two adjacent teeth is made deeper than that between other teeth. The lugs 74 on the rings extend radially beyond the teeth on clutch members 26a and 65, and when one of the rings is so positioned rotarially with respect to the clutch sleeve 31 that its lugs register with the spaces 75, as shown in Fig. 7, the lugs may enter the recesses and permit the sleeve to move into coupling relation with the clutch member toward which it is being urged. Each of the rings, when its lugs are not in the spaces 75 between the teeth of the sleeve, is allowed to move angularly a few degrees in either direction, just sufficient to make the lugs overlap the first tooth, as seen in Fig. 8. The lugs 74 of ring 71 work back and forth in a recess 76 in the inner face of the sleeve and those of ring 72 work back and forth in a similar recess 77. Each of these recesses has sufficient width adjacent the teeth to permit the ring to move from a position where the lugs could pass through the spaces between the teeth to where it will overlap them. Each recess is, however, somewhat triangular in shape, its sides approaching each other away from the teeth and converging to a narrow pocket 78. These pockets are in line with the deep spaces 75 between teeth.

With the sliding clutch sleeve 31 in normal position, as seen in Fig. 1, with its teeth intermeshed with the teeth on the dog carrier clutch member 26a, ring 72 is pressed into engagement with clutch member 26a and turns with the latter and the sleeve for the reason that its lugs occupy the deepened spaces 75 between the teeth on the sleeve. The other ring 71 is urged by spring 73 toward clutch member 65 but is held out of engagement with the latter by the sleeve. The lugs on this ring occupy three of the pockets 78 and thus the ring is made to rotate with the sleeve and its lugs are maintained in alignment with the spaces 75 between the teeth of the sleeve.

Clutch member 65 will be rotating synchronously with the sleeve 31 and the rings if the dogs of the centrifugal clutch are engaged with the inner clutch member 20; that is, if the automatic clutch is in direct drive, but, if the drive is through the outer clutch member and the dogs, clutch member 65 will be turning slower than ring 62. When sleeve 31 starts to move back ring 71 is permitted to engage frictionally with clutch member 65 and is thereby thrown around to blocking position; that is, to a position where its lugs overlap teeth on the sleeve 31. The sleeve is thus held against further movement in this direction (see Fig. 10) until the driver speeds up the engine. When the engine speed becomes such that the clutch member 65 just begins to exceed that of the ring 71, the ring starts to turn in the same direction as clutch member 65 and in doing so is brought to a position where its lugs register with the spaces 75 and the lugs slip into the spaces. This permits sleeve 31 to be moved the rest of the way and couple with clutch member 65. The device is now in direct drive, with the drive from main shaft 11 through clutch member 65 and sleeve 31 to the tail shaft 71. The device will be held in direct drive as long as the driver continues to hold down the button.

When the driver releases the button, spring 63 moves slide rod 62 forward until sleeve 31 is blocked by its teeth abutting ring 72. This movement uncouples the sleeve from clutch member 65, but if the centrifugal clutch is still in overdrive, clutch member 26a will be turning faster than sleeve 31. This causes ring 72 to be thrown around into blocking position, and the driver must retard the engine and thus reverse the relative direction of rotation between the ring and the clutch member 26a and cause the ring to turn to where its lugs can pass into the spaces 75. If, when the driver releases the button, the centrifugal dogs are engaged with the direct drive clutch member 20 and consequently clutch member 26a rotates at the same speed as the sleeve, the shift will take place immediately, without waiting for the driver to speed up the engine.

It will be seen that if, when sleeve 31 is shifted out of coupling relation to one of the clutch members 26a or 65 and moved toward the other, it happens that this other clutch member is moving faster or slower than the sleeve 31, the latter is prevented from completing its shift until the speed of the clutch member is brought to that of the sleeve. If, however, the speed of the clutch member is the same as that of the sleeve, the shift is completed immediately. When the car is standing and the driver puts the transmission into reverse, the sleeve 31 is not blocked but is permitted to make the complete shift immediately because both the main shaft and the tail shaft are stationary.

I claim:

1. Power transmission mechanism including a rotatable clutch member, a dog carrier rotatable coaxially therewith, a dog carried by said carrier and urged by centrifugal force away from said clutch member, spring means urging the dog toward said clutch member, detent means arranged to hold the dog against movement toward said clutch member until the speed of the dog carrier has fallen to a definite value, and blocking means for preventing the dog from immediately engaging the clutch member when it has released itself from the detent means, said blocking means comprising a drag shoe turning with said dog and arranged to have limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the clutch member and dog carrier reverse their direction of rotation relatively to each other.

2. Power transmission mechanism including a rotatable clutch member, a dog carrier rotatable coaxially therewith, a dog carried by said carrier and urged by centrifugal force toward said clutch member, spring means urging the dog away from said clutch member, detent means arranged to hold the dog against movement toward said clutch member until the speed of the dog carrier has risen to a definite value, and blocking means for preventing the dog from immediately engaging the clutch member when it has released itself from the detent means, said blocking means comprising a drag shoe turning with said dog and having limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the clutch member and dog carrier reverse their direction of rotation relatively to each other.

3. Power transmission mechanism including a rotatable clutch member, a dog carrier rotatable coaxially therewith, a dog carried by said carrier and urged by centrifugal force away from said clutch member, spring means urging the dog toward said clutch member, detent means arranged to hold the dog against movement toward said clutch member until the speed of the dog carrier has fallen to a definite value, and blocking means for preventing the dog from immediately engaging the clutch member when it has released itself from the detent means, said blocking means comprising a drag shoe turning with said dog and having limited rotary movement with respect thereto and a part rotating with the clutch member and disposed to be frictionally engaged by the drag shoe, said drag shoe being arranged to be pressed by the dog into contact with said part and thereby at first held in the path of the dog and thereafter moved out of the path of the dog when the speed of the clutch member is increased and slightly exceeds that of the dog carrier.

4. Power transmission mechanism including a rotatable clutch member a dog carrier rotatable coaxially therewith, a dog carried by said carrier and urged by centrifugal force toward said clutch member, spring means urging the dog away from said clutch member, detent means arranged to hold the dog against movement toward said clutch member until the speed of the dog carrier has risen to a definite value, and blocking means for preventing the dog from immediately engaging the clutch member when it has released itself from the detent means, said blocking means comprising a drag shoe turning with said dog and having limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the speed of the clutch member is decreased and becomes slightly less than that of the dog carrier.

5. Power transmission mechanism including a rotatable clutch member, a dog carrier rotatable coaxially therewith, a dog carried by said carrier and urged by centrifugal force toward said clutch member, detent means arranged to hold the dog against movement toward said clutch member until the speed of the dog carrier has risen to a definite value, and blocking means for preventing the dog from immediately engaging the clutch member when it has released itself from the detent means, said blocking means comprising a drag shoe turning with the dog and having limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the speed of the clutch member is decreased and becomes slightly less than that of the dog carrier.

6. Power transmission mechanism including an inner clutch member, an outer clutch member coaxial therewith and rotating at a different speed, a shaft coaxial with said clutch members, a dog carrier rotating with said shaft, a centrifugal dog carried by said carrier and adapted for engagement with either of said clutch members, spring means urging the dog toward engagement with the inner clutch member, detent means arranged to prevent disengagement of the dog from the inner clutch member until a definite speed is attained, and means for blocking the dog when it has disengaged itself to prevent it from immediately engaging with the outer clutch member, said blocking means comprising a part rotating with said outer clutch member and a friction shoe arranged to be forced by the dog into frictional engagement with said part and thereby held in blocking relation to the dog, said blocking means being so arranged that reversal of the direction of movement between the dog and the clutch member will cause the blocking means to release the dog.

7. Power transmission mechanism including an inner clutch member, an outer clutch member coaxial therewith and rotating at a different speed, a shaft coaxial with said clutch members, a dog carrier rotating with said shaft, a centrifugal dog carried by said carrier and adapted for engagement with either of said clutch members, means urging the dog toward engagement with the inner clutch member, detent meas arranged to prevent disengagement of the dog from the inner clutch member until a definite speed is attained, and means for blocking the dog when it has disengaged itself to prevent it from immediately engaging with the outer clutch member, said blocking means comprising a part rotating with said outer clutch member and a friction shoe arranged to be forced by the dog into fractional engagement with said part and thereby held in blocking relation to the dog, said blocking means being so arranged that reversal of the direction of movement between the dog and the clutch member will cause the blocking means to release the dog.

8. Power transmission mechanism including an inner clutch member, an outer clutch member coaxial therewith and rotating at a higher speed, a shaft coaxial with said clutch members, a dog carrier rotating with said shaft, a centrifugal dog carried by said carrier and adapted for engagement with either of said clutch members, spring means urging the dog toward engagement with the inner clutch member, detent means arranged to prevent disengagement of the dog from the outer clutch member until the speed has fallen to a definite value, and means for blocking the dog when it has disengaged itself to prevent it from immediately engaging with the inner clutch member, said blocking means comprising a part turning with said inner clutch member and a friction shoe arranged to be forced by the dog into frictional engagement with said part and thereby held in blocking relation to the dog, said blocking means being so arranged that reversal of the direction of movement between the dog and the clutch member will cause the blocking means to release the dog.

9. Power transmission mechanism including an inner clutch member, an outer clutch member coaxial therewith and rotating at a higher speed, a shaft coaxial with said clutch members, a dog carrier rotating with said shaft, a centrifugal dog carried by said carrier and adapted for engagement with either of said clutch members, means urging the dog toward engagement with the inner clutch member, detent means arranged to prevent disengagement of the dog from the outer clutch member until the speed has fallen to a definite value, and means for blocking the dog when it has disengaged itself to prevent it from immediately engaging with the inner clutch member, said blocking means comprising a part turning with said inner clutch member and a friction shoe arranged to be forced by the dog into frictional engagement with said part and thereby held in blocking relation to the dog, said blocking means being so arranged that reversal of the direction of movement between the dog and the clutch member will cause the blocking means to release the dog.

10. Power transmission mechanism including an inner driving clutch member, an outer driving clutch member coaxial therewith and rotating at a higher speed, a dog carrier, a centrifugal dog carried by said carrier and adapted for engagement with either of said clutch members, means opposing the influence of centrifugal force and tending to urge the dog toward engagement with the inner clutch member, detent means arranged to prevent disengagement of the dog from the inner clutch member until a definite speed is attained, and to prevent disengagement of the dog from the outer clutch member until the speed has fallen to a definite value, and means for blocking the dog when it has disengaged itself from one of the clutch members and preventing it from immediately engaging with the other clutch member, said blocking means comprising a part turning with each of said clutch members and means turning with the dog and comprising a friction shoe arranged to be forced into frictional engagement with that one of said parts toward which the dog is urged and thereby held in blocking relation to the dog until the said part and the dog reverse their relative direction of rotation.

11. Power transmission mechanism including a driving shaft, an inner clutch member coaxial therewith and rotating therewith, a gear train driven from said driving shaft and including a gear coaxial with said shaft, an outer clutch member rotating with said gear at a speed higher than that of the inner clutch member, a driven shaft coaxial with the driving shaft, a centrifugal dog carried by said driven shaft and arranged to couple said driven shaft with either of said clutch members, spring means urging the dog toward engagement with the inner clutch member, detent means for restraining said dog and preventing its disengaging itself from said inner clutch member until a definite driven-shaft speed is attained, means arranged to prevent immediate engagement of the dog with the outer clutch member after it has disengaged itself from the inner clutch member, said means comprising a part turning with the outer clutch member and a member arranged to be forced by the dog into frictional engagement with said part and thereby to be moved into the path of the dog and block the same, and to be moved out of the path of the dog when the relative rotation between the outer clutch member and the driven shaft reverses in direction, and thus release the dog and permit it to move further and engage the outer clutch member.

12. Power transmission mechanism including a driving shaft, an inner clutch member coaxial therewith and rotating therewith, a gear train driven from said driving shaft and including a gear coaxial with said shaft, an outer clutch member rotating with said gear at a speed higher than that of the inner clutch member, a driven shaft coaxial with the driving shaft, a centrifugal dog carried by said driven shaft and arranged to couple said driven shaft with either of said clutch members, spring means urging the dog toward engagement with the inner clutch member, detent means for restraining said dog and preventing it from disengaging itself from said outer clutch member until the driven shaft speed has fallen to a definite value, means arranged to prevent immediate engagement of the dog with the inner clutch member after it has disengaged itself from the outer clutch member, said means comprising a part turning with the inner clutch member, and a member arranged to be forced into frictional engagement with said part and thereby to be moved into the path of the dog and block the same, and to be moved out of the path of the dog when the relative rotation between the driven shaft and the inner clutch member reverses in direction and thus release the dog and permit it to move further and engage the inner clutch member.

13. Power transmission mechanism including an inner driving clutch member, an outer driving clutch member coaxial therewith and rotating at a higher speed, a dog carrier, a plurality of dogs carried by said carrier, each adapted for engagement with either of said clutch members, means opposing the influence of centrifugal force and tending to urge the dogs toward engagement with the inner clutch member, detent means arranged to prevent disengagement of the dogs from the inner clutch member until a definite speed is attained, means for blocking each of the dogs when it has disengaged itself from the inner clutch member and preventing it from immediately engaging with the outer clutch member, said blocking means comprising a part turning with said outer clutch member and means turning with the dog and including a friction shoe arranged to be forced into frictional engagement with said part and thereby held in block-relation to the dog until said part and the dog carrier reverse their relative direction of rotation, and interlocking means so arranged as to prevent one dog being released and thus permitted to engage the outer clutch member while another dog is engaged with the inner clutch member.

14. Power transmission mechanism including an inner driving clutch member, an outer driving clutch member coaxial therewith and rotating at a higher speed, a dog carrier, a plurality of dogs carried by said carrier, each adapted for engagement with either of said clutch members, means opposing the influence of centrifugal force and tending to urge the dogs toward engagement with the inner clutch member, detent means arranged to prevent disengagement of the dogs from the outer clutch member until the speed has fallen to a definite value, means for blocking each of the dogs when it has disengaged itself from the outer clutch member and preventing it from immediately engaging with the inner clutch member, said means comprising a part turning with said inner clutch member and means turning with the dog and including a friction shoe arranged to be forced into frictional engagement with said part and thereby held in blocking relation to the dog until said part and the dog carrier reverse their relative direction of rotation, and interlocking means so arranged as to prevent one dog being released and thus permitted to engage the inner clutch member while another dog is engaged with the outer clutch member.

15. Power transmission mechanism including an inner clutch member, an outer clutch member coaxial therewith, a dog carrier, a plurality of dogs carried by said carrier, each adapted for engagement with either of said clutch members, spring means tending to urge the dogs toward engagement with the inner clutch member, detent means arranged to prevent disengagement of the dogs from the inner clutch member until a definite speed is attained, means for blocking each of the dogs when it has disengaged itself from the inner clutch member and preventing it from immediately engaging with the outer clutch member, said blocking means comprising a part turning with said outer clutch member and a member arranged to be forced by the dog into frictional engagement with said part and thereby to be moved into the path of the dog and block the same, and to be moved out of the path of the dog when the relative rotation between the outer clutch member and the dog carrier reverses in direction, and thus release the dog and permit it to move further and engage the outer clutch member, and interlocking means so arranged as to prevent one dog being released and thus permitted to engage the outer clutch member while another dog is engaged with the inner clutch member.

16. Power transmission mechanism including an inner clutch member, an outer clutch member coaxial therewith, a dog carrier, a plurality of dogs carried by said carrier, each adapted for engagement with either of said clutch members, spring means tending to urge the dogs toward engagement with the inner clutch member, detent means arranged to prevent disengagement of the dogs from the outer clutch member until the speed has fallen to a definite value, means for blocking each of the dogs when it has disengaged itself from the outer clutch member and preventing it from immediately engaging with the inner clutch member, said blocking means comprising a part turning with said inner clutch member and a member arranged to be forced by the dog into frictional engagement with said part and thereby to be moved into the path of the dog and block the same, and to be moved out of the path of the dog when the relative rotation between the inner clutch member and the dog carrier reverses in direction, and thus release the dog and permit it to move further and engage the inner clutch member, and interlocking means so arranged as to prevent one dog being released and thus permitted to engage the inner clutch member while another dog is engaged with the outer clutch member.

17. Power transmission mechanism including a driving shaft, a clutch member arranged to rotate therewith, a driven shaft, a dog carrier rotatable with said driven shaft, a dog carried by said carrier and urged by centrifugal force away from said clutch member, spring means urging the dog toward said clutch member, detent means arranged to hold the dog against movement toward said clutch member until the speed of the dog carrier has fallen to a definite value, and blocking means for preventing the dog from immediately engaging the clutch member when it has released itself from the detent means, said blocking means comprising a drag shoe turning with said dog and arranged to have limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the clutch member and dog carrier reverse their direction of rotation relatively to each other, and manually operable means for drivingly connecting said driven shaft to either the driving shaft or said dog carrier.

18. Power transmission mechanism including a driving shaft, a clutch member rotating at a speed higher than that of said driving shaft, a dog carrier rotatable coaxially therewith, a dog carried by said carrier and urged by centrifugal force toward said clutch member, spring means urging the dog away from said clutch member, detent means arranged to hold the dog against movement toward said clutch member until the speed of the dog carrier has risen to a definite value, and blocking means for preventing the dog from immediately engaging the clutch member when it has released itself from the detent means, said blocking means comprising a drag shoe turning with said dog and having limited rotary movement with respect thereto, and a part rotating with the clutch member and disposed to be frictionally engaged by the drag shoe, said drag shoe being arranged to be pressed by the dog into contact with said part and thereby at first held in the path of the dog and thereafter moved out of the path of the dog when the clutch member and dog carrier reverse their direction of rotation relatively to each other, a driven shaft, and manually operable means for drivingly connecting said driven shaft to either the driving shaft or said dog carrier.

CHARLES L. HOPKINS.

CERTIFICATE OF CORRECTION.

Patent No. 2,210,668.   August 6, 1940.

CHARLES L. HOPKINS.

It is hereby certified that error appears in the printed specification of the above numbered patent requiring correction as follows: Page 6, second column, line 30, claim 7, for "meas" read --means--; line 39, same claim, for the word "fractional" read --frictional--; and that the said Letters Patent should be read with this correction therein that the same may conform to the record of the case in the Patent Office.

Signed and sealed this 10th day of September, A. D. 1940.

Leslie Frazer,
Acting Commissioner of Patents.

(Seal)